United States Patent [19]

Bassett

[11] 4,379,049
[45] Apr. 5, 1983

[54] FINE MATERIAL SCREW WASHER

[76] Inventor: Leo H. Bassett, Burrton, Kans. 67020

[21] Appl. No.: 281,430

[22] Filed: Jul. 8, 1981

[51] Int. Cl.³ .............................................. B03B 5/52
[52] U.S. Cl. .................................... 209/464; 308/244; 384/259
[58] Field of Search ............... 209/463, 464, 450, 278, 209/283; 210/523, 525; 100/145–150, 117; 366/318; 308/32, 33, 31, 60, 59, 244

[56] References Cited

U.S. PATENT DOCUMENTS

| | | | |
|---|---|---|---|
| 596,280 | 12/1897 | Short | 308/244 X |
| 675,411 | 6/1901 | Record | 308/31 |
| 1,130,233 | 3/1915 | Wood | 308/32 |
| 1,190,406 | 7/1916 | Haverly | 209/450 |
| 1,264,135 | 4/1918 | Alderson | 209/464 |
| 2,054,671 | 9/1936 | Daman | 209/464 X |
| 2,283,992 | 5/1942 | Hirsch | 209/464 |
| 3,587,858 | 6/1971 | Christianson | 209/283 X |

*Primary Examiner*—Ralph J. Hill
*Attorney, Agent, or Firm*—Edward L. Brown, Jr.

[57] ABSTRACT

A screw-type fine material classifier or washer having externally mounted support bearings with the ends of the screw extending through the end walls of the tank and waterproof seals. The bearings and seals being adjustable so that the screw may be moved both vertically and horizontally to adjust the clearance between the screw and the belly pan of the washer.

7 Claims, 5 Drawing Figures

FINE MATERIAL SCREW WASHER

BACKGROUND OF THE INVENTION

The present invention is directed toward a screw-type aggregate and fine material washer also known as dewaterers or classifers. Screw washers have a variety of functions from removing excess water from sand, and washing sand to remove slimes, silt and clays. Screw washers are built to various diameters and lengths, as well as single and double screw designs. The water volume in feed slurry varies with the requirements of the materials as well as the speed for turning the screw, and also the tolerance between the walls of the tank and the screw. The material being treated is fed into the lower end of the washer which contains a slurry, while the turning screw moves the material towards the opposite discharge end of the washer which is normally elevated. The bottom of the washer has an arcuate surface in close proximity to the spiral-shaped screw which is sometimes referred to as a belly pan. The tolerance between the screw and the belly pan is quite close in a dewatering application wherein the sand is squeezed between the wear shoes on the screw and the belly pan of the washer. Due to the abrasive affect on the screw, it is quite often necessary to adjust the position of the screw in the washer to attain the optimum clearance for the particular sand or gravel being treated. The concept of replaceable wear shoes on the screw has long been known in the prior art as well as the use of rubber or other abrasion resistant shoe materials.

The standard screw is made up from a heavy gauge steel pipe having continuous spiral screw flights welded to the pipe from one end to the other. The support bearings of most washers, at the lower end of the washer, are normally submersible bearings within the slurry tank. Some of the prior art patents teach a method of vertically adjusting the bearing so that the clearance between the screw and the belly pan of the tank can be adjusted at one end only.

SUMMARY OF THE INVENTION

The washer of the present invention provides a means for adjustably positioning the screw not only in the vertical direction but also horizontally. In the present invention, the bearings are adjustable at both ends of the washer rather than one, which provides a much more accurate means of setting the clearance between the screw and the belly pan. While there are other washers on the market which mount their screws on externally located bearings rather than submersible bearings in the tank, there are none which allow the external bearing to be adjustable both in a horizontal and vertical direction, as in the present invention. By use of the slidable seal plate on the lower end wall of the tank in conjunction with a shaft seal carried by the seal plate, it is possible to shift to the support shaft of the screw while maintaining a fluid seal at the tub end of the washer.

Therefore the principal object of the present invention is to provide an externally supported screw washer which allows the screw to be laterally adjusted in both a horizontal and vertical direction while maintaining a fluid seal between the end walls of the tub and the support bearings.

Another object of the present invention is to provide a sand dewatering screw which provides a very close clearance adjustment between the screw and belly pan for dewatering fine sand.

Another object of the present invention is to provide a very simplified screw washer design which utilizes conventional pillow block bearings in a very rugged and efficiently operated structure.

DETAILED DESCRIPTION OF THE PREFERRED EMBODIMENT

Figure 1:
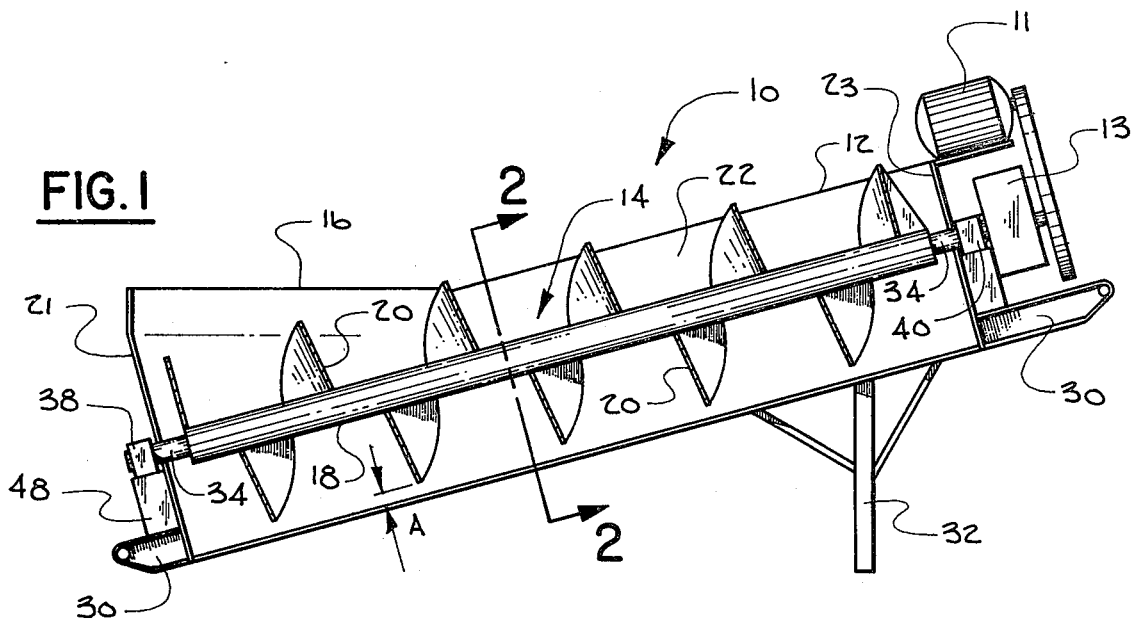
FIG. 1 is a side elevational view of a screw washer, taken in longitudinal section.

The screw washer of the present invention is generally described by reference numeral 10 and is best seen in FIG. 1. The washer is made up of open top longitudinal tank 12 with a spiral screw 14 extending the full length thereof. The screw 14 is driven by motor 11 through a gear reducer 13. The washer tank 12 is enlarged at its lower left end, as seen in the drawing, forming a tub area 16 for encompassing the settling pool of the washer 10. The material being washed or separated is introduced into the top of tub 16 while the water is introduced at the bottom area of tub 16, although the overall structure is not described in any detail since the arrangement is well known in the art. The tubular pipe 18 with a welded flight added to the pipe throughout its length. Each flight 20 of the screw can include bolt-on wear shoes which can be replaced at intervals without replacing the entire screw 14. A standard screw has a one-half pitch whereby the distance between each flight 20 is one-half of the screw diameter. Various pitch screws can be used depending upon the desired use. As for example, with a dewatering screw utilized with very fine material, a very slow speed screw with a double or triple pitch would be desirable.

Figure 2:
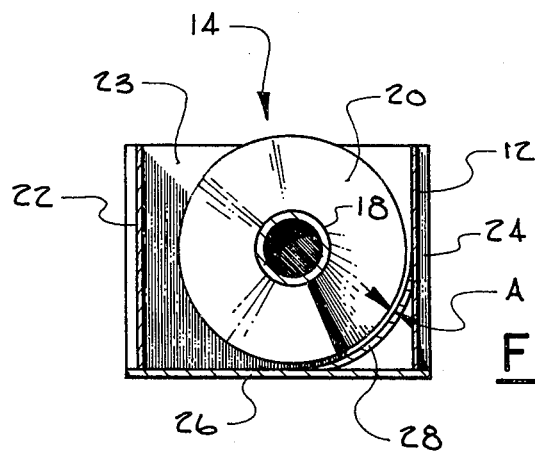
FIG. 2 is a vertical section taken along lines 2—2 of FIG. 1.

In viewing FIG. 2, the tank comprises side walls 22 and 24 joined by a bottom 26. Located between side wall 24 and bottom 26 is a curved belly pan 28 which extends the full length of the tank 12 with an arcuate cross section as seen in FIG. 2, with a radius slightly greater than the O.D. of screw 14.

The space "A", between the O.D. of the screw and the belly pan 28 remains uniform as the flights 20 move up the tank 12, as seen in FIGS. 1 and 2.

The lower portions of tank 12 are surrounded by a heavy gauge steel skid frame 30 which is held elevated at its discharge end by support legs 32.

Figure 4:
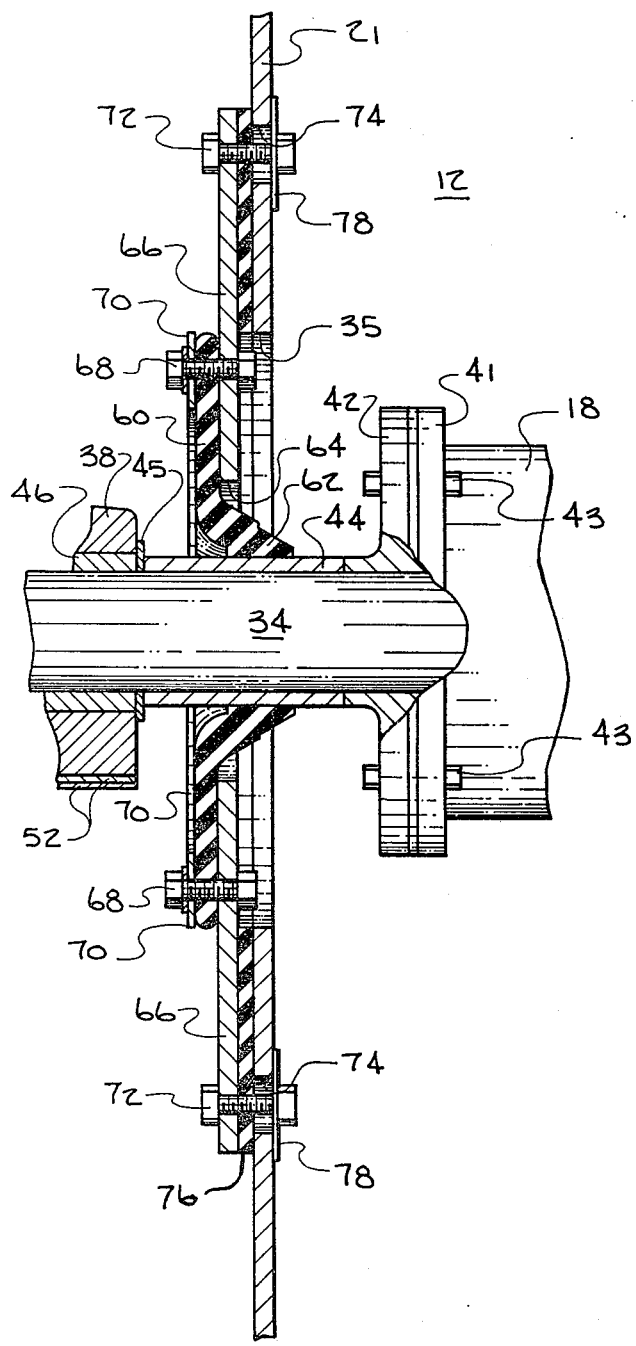
FIG. 4 is an enlarged sectional view taken along lines 4—4 of FIG. 3.
Figure 5:
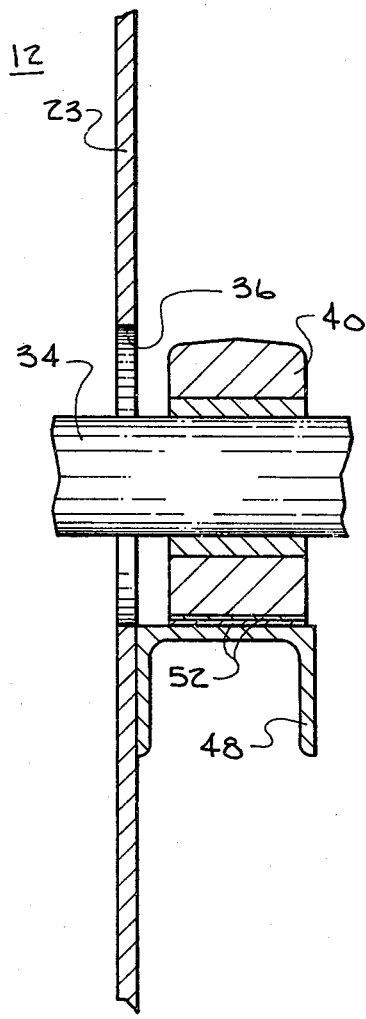
FIG. 5 is a sectional view of the bearing on the opposite end of the screw shaft.

Attached at opposite ends of the pipe 18 are short support shafts 34, as seen in FIGS. 1, 4 and 5. Shafts 34 extend through openings 35 and 36 in lower end wall 21 and upper end wall 23, respectively. The screw 14 is supported externally of the tank 12 by conventional pillow block bearings 38 and 40, located outside the end walls 21 and 23 of the tank 12. Since the tub area 16 of the tank is filled with water, it is necessary to seal the left hand support shaft 34, as it exits the tank, which is shown in detail in FIG. 4.

The end of pipe 18 is formed with a flange 41 which is bolted to a similar flange 42 on support shaft 34. Removable bolts 43 allow removal of the support shaft 34 when disassembling the screw 14 or replacement of shaft 34. Positioned over shaft 34 is a spacing sleeve 44 which is snugly held in place by a ring 45 which is heat-sweated to support shaft 34. Ring 45 turns with the shaft 34 and transfers the thrust loading to bearing sleeve 46 of pillow block bearing 38. In viewing FIG. 3, bearing 38 is bolted to a horizontal support member 48 which in turn is anchored to the lower end wall 21 of the tank 12. By loosening bolts 50, a plurality of shims 52 can be added or removed between pillow block bearing 38 and support member 48 to adjust the vertical position of screw 14. Anchored to end wall 21 are a pair of base members 54 on opposite sides of the bearing 38 which threadably receive opposing lockable set screws 56 and 58 which in turn position bearing 38 in a horizontal direction. Surrounding support shaft 34 and spacing sleeve 44 is a flexible shaft seal 60 which tightly seals any fluid from tank 12 from flowing across sleeve 44, while turning thereon. Shaft seal 60 is shaped with an inner extending lip 62, which assists in maintaining the seal due to the hydrostatic pressure in tank 12. Shaft seal 60 is concentrically spaced in an aperture 64 in seal plate 66. Bolts 68 and mounting ring 70 maintain shaft seal 60 in sealing engagement with seal plate 66 with the exception of the center opening in shaft seal 60.

Figure 3:
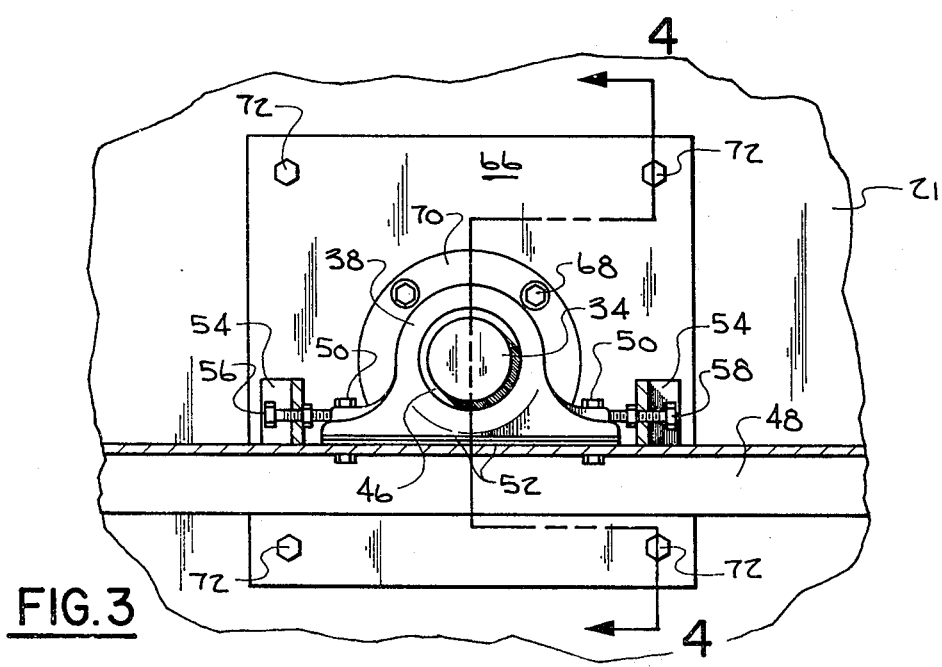
FIG. 3 is an enlarged partial view of the lower end wall of the washer illustrating the exterior mounted bearing and its related structure.

Seal plate 66, as best seen in FIGS. 3 and 4, is square in shape with four removable bolts 72, one located at each corner. Each bolt 72 has a substantially smaller diameter than the bolt hole 74 in the end wall 21, as best seen in FIG. 4, thereby allowing the seal plate 66 to be shifted both laterally and vertically within the tolerance of bolt holes 74. Flat seal 76 is positioned between seal plate 66 and the end wall 21 of the tank so that when bolts 72 are tightened down on washers 78, a complete fluid seal is provided between the seal plate 66 and the end wall 21.

Located on the opposite end of screw 14 is a similar pillow block bearing 40, as illustrated in FIG. 5. Support shaft 34 extends on through pillow block bearing 40 to a gear reducer 13, as seen in FIG. 1, which in turn is driven by drive motor 11. Positioned under bearing 40 are a series of shims 52 for vertical adjustment of the upper end of screw 14 while there are similar set screws, as seen in FIG. 3, which permit the bearing 40 to be horizontally shifted.

OPERATION

At times it is necessary to adjust the clearance in the washer 10 between the screw 14 and the belly pan 28 of the tank, which is indicated by "A" in FIGS. 1 and 2. One reason for adjustment might be that the clearance has become too large merely because of wear on the screw 14. Another reason would be that the particular sand being dewatered requires a very tight clearance.

As for example, if it was desirous to decrease the clearance A on the washer 10, it would be necessary to shift the screw 14 rightwardly, as viewed in FIG. 2, and down, so as to maintain a constant clearance across the complete radial area of the belly pan 28. This would be accomplished by loosening bolts 50 and lock nuts on set screws 56 and 58 in preparation for shifting pillow block bearing 38 to the right, as viewed in FIG. 3. However, before bearing 38 can be moved, it is necessary to also loosen bolts 72 at the four corners of seal plate 66 so that the seal plate can also shift on end plate 21 and maintain support shaft 34 concentrically positioned in aperture 64 of the sealing plate 66. With bolts 50, 72 and set screw 58 loosened, bearing 38 can be shifted to the right by tightening set screw 56. To lower bearing 38, one or more of the shims 52 can be withdrawn from under bearing 38 until the correct vertical clearance is achieved. Once this is accomplished, bolts 50 are tightened, which fixes the position of bearing 38. Bolts 72 on the seal plate may also be tightened, thereby sealing any leakage of water from tank 12. Seal plate 66 can be shifted either up or down within the tolerance of bolts 72 in oversized openings 74, as seen in FIG. 4. A similar horizontal and vertical adjustment can also be made on pillow block bearing 40 at the opposite end of screw 14. However, in the case of bearing 40, it is not necessary to maintain a fluid seal, since the upper end of screw 14 is above water level. However, if it is desirous to maintain a fluid seal at both ends, a similar seal plate 66 and shaft seal 60 could also be used on the upper end wall 23 of the tank.

Although only a single preferred embodiment of the invention has been described and illustrated, various modifications within the spirit and scope of the invention will become apparent to those skilled in the art and can be made without departing from the underlying principles of the invention. Therefore the invention should not be limited to the specific illustration and disclosure, but only to the following claims.

I claim:

1. A fine material screw washer comprising a longitudinal tank having a belly pan therein, upper and lower end walls, a spiral screw extending longitudinally in the tank in close proximity to the belly pan, the screw having a support shaft at each end thereof which extends through openings in the upper and lower end walls of the tank, support bearings for said shaft positioned on the outside of the end walls for supporting the screw, the improvement comprising:

adjustment means associated with each support bearing allowing separate horizontal and vertical movement of the bearing to adjust the clearance between the screw and the belly pan;

an adjustably movable seal plate positioned over the opening in the lower end wall including a seal therebetween, an aperture in the seal plate for passage of the support shaft; and a flexible shaft seal attached to the seal plate approximate the aperture surrounding the support shaft whereby as the bearing requires horizontal or vertical adjustment, the seal plate can be adjusted in a like manner.

2. A fine material washer as set forth in claim 1 wherein the seal plate is positioned on the outside of the end wall, removable fastening means around the periphery of the seal plate for removably anchoring the seal plate to the end wall of the tank.

3. A fine material washer as set forth in claim 1 wherein the seal plate is positioned on the outside of the end wall, removable fastening means around the periphery of the seal plate for removably anchoring the seal plate to the end wall and oversized openings in the end wall for receipt of the fastening means thereby allowing lateral adjustment of the seal plate when the fastening means is loosened.

4. A fine material washer as set forth in claim 1, wherein the adjustment means includes a horizontal support member attached to the end wall which supports said bearing, and an adjustable screw anchored to the support member for horizontal movement of the bearing on the support member and removable shims between the bearing and support member for vertical adjustment of said bearing.

5. A fine material washer as set forth in claim 1, wherein the adjustment means includes a horizontal support member attached to the end wall, a pair of opposed lockable set screws anchored to the support member for horizontal movement of the bearing, and removable shims positioned between the bearing and the horizontal support member for vertical adjustment of the bearing.

6. A fine material washer as set forth in claim 1, wherein the adjustment means includes a horizontal support member attached to the end wall, a pair of opposed lockable set screws anchored to the support member for horizontal movement of the bearing, and removable shims positioned between the bearing and the horizontal support member for vertical adjustment of the bearing, and the seal plate is positioned on the outside of the end wall, removable fastening means around the periphery of the seal plate for removably anchoring the seal plate to the end wall of the tank.

7. A fine material washer as set forth in claim 1, wherein the adjustment means includes a horizontal support member attached to the end wall, a pair of opposed lockable set screws anchored to the support member for horizontal movement of the bearing, and removable shims positioned between the bearing and the horizontal support member for vertical adjustment of the bearing, and the seal plate is positioned on the outside of the end wall, removable fastening means around the periphery of the seal plate for removably anchoring the seal plate to the end wall and oversized openings in the end wall for receipt of the fastening means thereby allowing lateral adjustment of the seal plate when the fastening means is loosened.

* * * * *